(12) United States Patent
Moosmann et al.

(10) Patent No.: US 9,108,222 B2
(45) Date of Patent: Aug. 18, 2015

(54) METHOD AND DEVICE FOR FRACTIONATING BULK MATERIAL

(75) Inventors: Jurgen Moosmann, Kreuzlingen (CH); Bruno Fassler, Appenzell (CH)

(73) Assignee: Bühler AG, Uzwil (CH)

( * ) Notice: Subject to any disclaimer, the term of this patent is extended or adjusted under 35 U.S.C. 154(b) by 0 days.

(21) Appl. No.: 14/115,334

(22) PCT Filed: May 2, 2012

(86) PCT No.: PCT/EP2012/057986
§ 371 (c)(1),
(2), (4) Date: Dec. 9, 2013

(87) PCT Pub. No.: WO2012/150239
PCT Pub. Date: Nov. 8, 2012

(65) Prior Publication Data
US 2014/0299519 A1   Oct. 9, 2014

(30) Foreign Application Priority Data
May 3, 2011   (EP) .................................... 11164663

(51) Int. Cl.
*B07B 1/28* (2006.01)
*B07B 1/42* (2006.01)
(Continued)

(52) U.S. Cl.
CPC . *B07B 1/284* (2013.01); *B07B 1/42* (2013.01); *B07B 4/08* (2013.01); *F16H 7/02* (2013.01); *Y10T 29/49716* (2015.01)

(58) Field of Classification Search
CPC ............ B07B 1/28; B07B 1/284; B07B 1/30; B07B 1/38; B07B 1/42
USPC .............. 209/332, 370, 373, 405, 412, 366.5, 209/367
See application file for complete search history.

(56) References Cited

U.S. PATENT DOCUMENTS 671,347 A * 4/1901 Malsness ....................... 209/311
907,045 A * 12/1908 Harrison ........................... 74/86
(Continued)

FOREIGN PATENT DOCUMENTS

DE     102004054275      5/2006
EP        0112643 A2 *   7/1984
(Continued)

*Primary Examiner* — David H Bollinger
(74) *Attorney, Agent, or Firm* — Davis & Bujold, P.L.L.C.; Michael J. Bujold

(57) ABSTRACT

The method for fractionating bulk material comprises the step of feeding the bulk material to at least one screen in a device (1) comprising at least one housing (10) with an inner space for receiving the screen. The housing (10) has at least one inlet (13) for feeding the bulk material and at least one outlet for discharging at least one fraction of the bulk material. The housing (10) has a roof (15) and a floor (16), with at least a gyrating mass (17) respectively arranged on the roof and the floor. The device (1) also has at least one mechanical coupling means, wherein the gyrating masses are coupled to one another by the mechanical coupling means (21) arranged outside the inner space and can be driven. The device (1) has a drive means for driving the mechanical coupling means. The method also comprises the step of setting the housing (10) in an oscillating motion by means of driving the gyrating masses. In a further method step, the fractionating of the bulk material is performed by means of the screen. Subsequently, a discharge of at least one of the fractions of the bulk material from the housing takes place through the outlet.

8 Claims, 6 Drawing Sheets

(51) Int. Cl.
*B07B 4/08* (2006.01)
*F16H 7/02* (2006.01)

(56) References Cited

U.S. PATENT DOCUMENTS 2,479,682 A * 8/1949 Hebebrand ..................... 74/87
2,634,617 A * 4/1953 Dryg ............................... 74/87
2,957,578 A * 10/1960 Ball et al. ..................... 209/370
3,032,200 A * 5/1962 Miller ........................... 209/366
3,981,403 A * 9/1976 Zimmerman et al. ..... 209/366.5

FOREIGN PATENT DOCUMENTS

| EP | 0182831 | 6/1986 |
| EP | 0162014 | 12/1987 |
| FR | 610289 | 9/1926 |
| WO | WO87/05542 A1 * | 9/1987 |

* cited by examiner

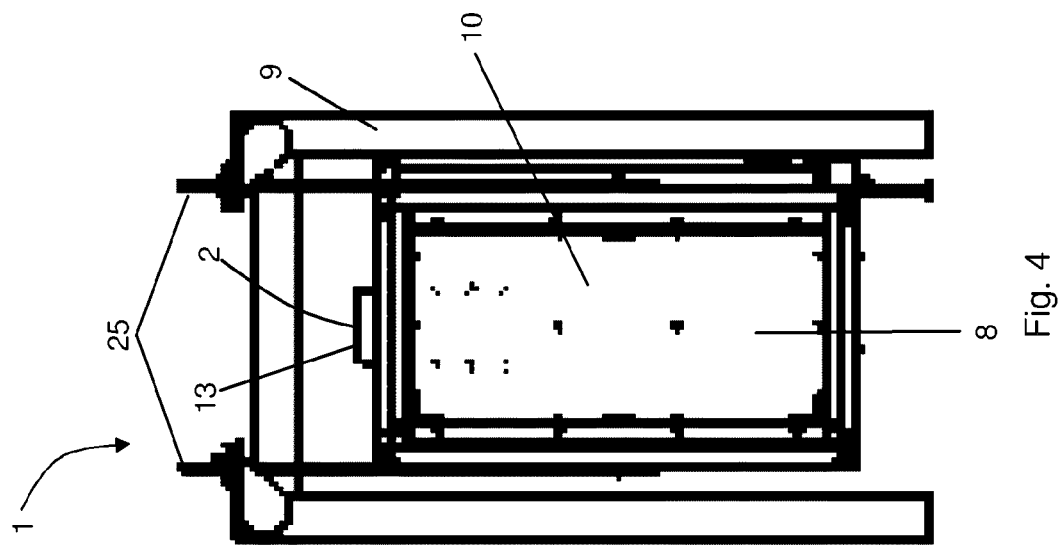
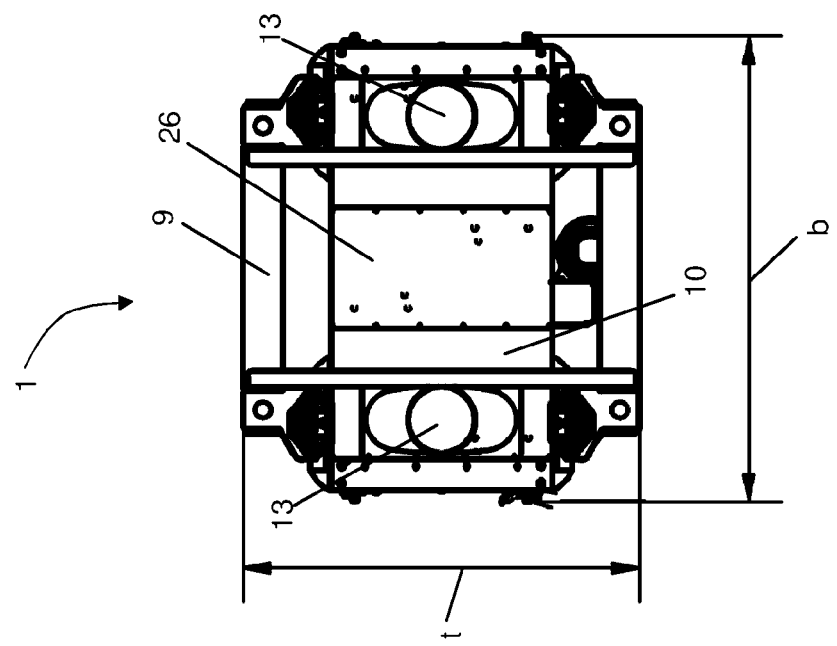

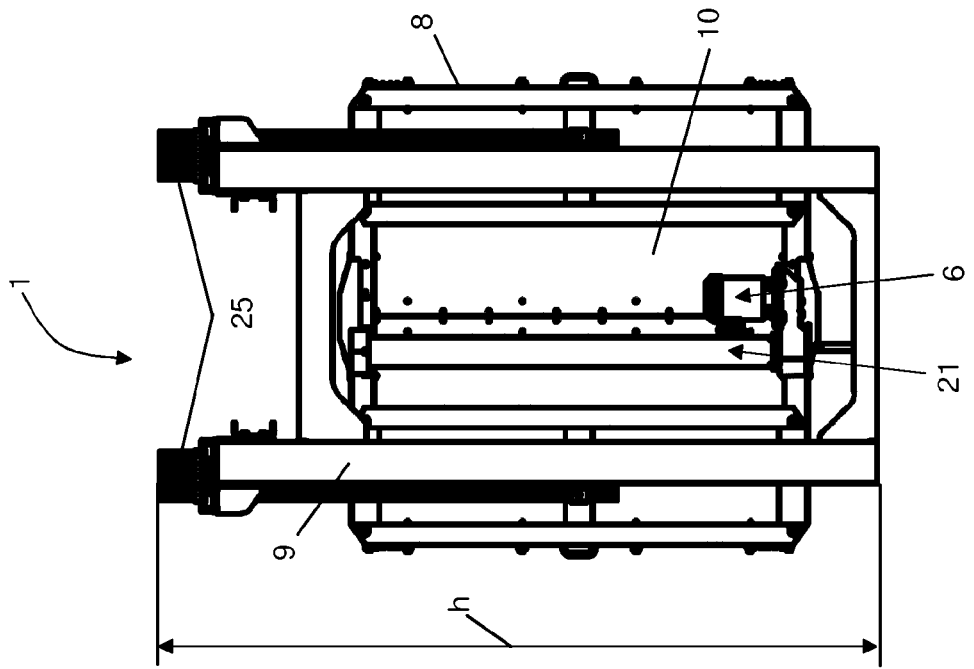
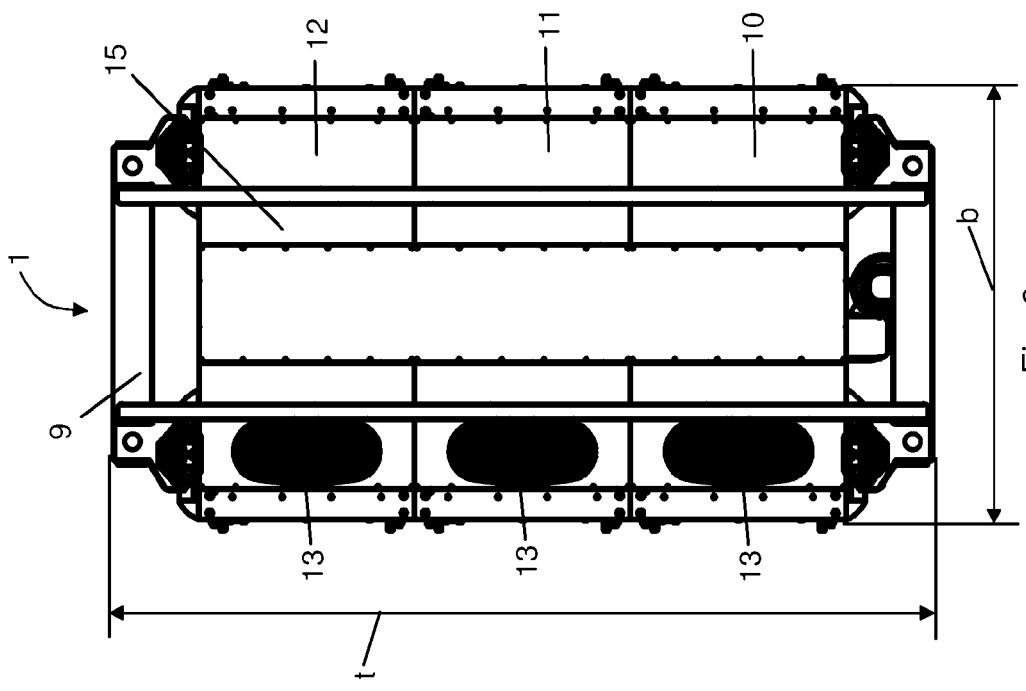

METHOD AND DEVICE FOR FRACTIONATING BULK MATERIAL

The present invention relates to a method and a device for fractionating bulk material in accordance with the preambles of the independent claims, to the use of the device for fractionation and also to a method for converting and/or upgrading a device for fractionation.

EP 0 182 831 B1 discloses a device for separating heavy material, in particular stones or the like, from cereal and other bulk materials. This device has two vibrating tables which are situated above one another and are arranged at an inclination and through which the same air flows. The upper vibrating table has a product inlet and a discharge directed toward a central region of the lower vibrating table, wherein the lower vibrating table is designed as a atone separating table, i.e. as a screen. Both vibrating tables have a common drive. The upper vibrating table is designed as a layer-forming table which has only at its lower end a region for a through-fall of a layer of material.

However, this known prior art has the disadvantage that, on the one hand, the nowadays required throughput of bulk material which is intended to be fractionated in the device is not achieved. Moreover, the device has to be operated in a complicated manner since it must be set into an oscillating motion and air must also be conveyed through the two vibrating tables. This further makes the device complicated in terms of design, and therefore the machine is costly to produce and also to operate.

It is therefore an object of the present invention to avoid the disadvantages of the known device, in particular thus to provide a method and a device by means of which bulk material can be fractionated in the device with a high throughput, wherein the device can additionally be operated in a low-maintenance manner and wherein the device can be produced at low costs and is also cost-effective to operate. A further object of the present invention is additionally to provide means for converting and/or upgrading already existing devices for fractionating bulk material.

These objects are achieved by a method and a device having the features of the independent claims.

The method according to the invention for fractionating bulk material comprises the step of feeding the bulk material to at least one screen in a device for fractionation. The device comprises at least one housing with an inner space for receiving the at least one screen. The screen is in particular a screen stack. The housing has at least one inlet for feeding the bulk material and at least one outlet for discharging at least one fraction of the bulk material. The housing, when used as intended, has a roof and a floor, wherein at least one respective gyrating mass is arranged on or in the roof and on or in the floor. The device additionally has at least one mechanical coupling means arranged outside the inner space, wherein the gyrating masses are coupled to one another and can be driven by way of the mechanical coupling means. The device has a drive means for driving the mechanical coupling means. The method according to the invention additionally comprises the step of setting the at least one housing in an oscillating motion by means of driving the gyrating masses by driving the mechanical coupling means. The method step of feeding the bulk material and of setting the device into an oscillating motion can be carried out in any desired sequence. In a further method step, the bulk material is fractionated by means of the screen into at least one first fraction and one second fraction. This method step takes place after carrying out the previous method steps. This is followed by discharging at least one of the fractions of the bulk material out of the housing through the outlet.

Bulk material is understood as meaning within the sense of the present application free-flowing material such as, for example, cereal, sand or else plastic in particle form.

The inner space of the housing for receiving the screens in understood as meaning within the sense of the present application the envelope surface of the inner side of the housing, i.e. for example the region enclosed by the surfaces, facing the inner space, of roof, floor and outer lateral surfaces of the housing. For example, a mechanical coupling means, which connects gyrating masses on or in the roof and on or in the floor and is guided in an encapsulated manner between the outer lateral surfaces of the housing, is considered as being situated within the inner space within the meaning of the present application.

The wording that a gyrating mass is arranged on or in the roof and on or in the floor means within the meaning of the present application that the respective gyrating mass is not arranged within the inner space. For example, the roof and/or the floor can be designed as a cavity, separate from the inner space, in which the gyrating mass is arranged.

The wording that a gyrating mass is arranged on the floor of the housing is understood within the meaning of the present application that the gyrating mass is arranged on the outside of the floor, i.e. the underside, of the housing. The gyrating mass is thus not arranged in the inner space of the housing.

This method has the advantage that it can be carried out cost-effectively with the device used, since the device is, inter alia, cost-effective to produce and, on the other hand, the device must only be set in an oscillating movement during the operation and, for example, no additional air flows have to be supplied, which is costly.

A further advantage of the method according to the invention is the high achievable throughput of bulk material to be fractionated, since the mechanical coupling means are arranged outside the inner space and thus do not impede the fractionation in the inner space.

The use of screen stacks is particularly advantageous, with the result that the size of the screen openings can be adapted as a function of the position of the respective screen in the screen stack in order to further increase the throughput of bulk material to be fractionated through the device. This can be achieved for example in that the screens arranged toward the roof have larger screen openings and these screen sizes can be selected to be smaller toward the floor. This design of the device used in the method makes it possible to achieve good fractionation with a simultaneous increase in the throughput.

Within the sense of the present application, a screen has a screen surface which can be covered, for example, with screen cloth, wherein the screen has screen openings, i.e. openings in the screen structure, through which material up to a defined maximum size can fall.

Unpurified cereal is preferably fractionated in the method. In particular, the first fraction substantially contains coarse impurities and the second fraction substantially contains the purified cereal.

Within the sense of the present application, unpurified cereal is to be understood as meaning such cereal which comprises, inter alia, the cereal and also dirt, sand, coarse impurities or, for example, else metal parts and any desired mixtures thereof. Coarse impurities are to be understood within the sense of the present application as meaning a coarse part of the unpurified cereal which is not cereal grain; in other words, coarse impurities are to be understood as meaning coarse parts which have to the extent of at least 90% an average size greater than a cereal grain.

The bulk material is particularly preferably fractionated into at least two fractions, preferably into three fractions, particularly preferably into four fractions, and very particularly preferably into at least five fractions.

This has the advantage that the bulk material to be fractionated is divided into a plurality of fractions and thus purified grain is obtained with fewer contaminants since, on the one hand, for example larger and also smaller particles than the cereal grains, for example thus coarse impurities and sand, can be separated from the cereal grains.

Bulk material is very particularly preferably fed to the housing at a feed rate of at least 50 t/h, preferably at least 100 t/h, and particularly preferably of at least 100 t/h, wherein the bulk material is fractionated.

Within the sense of the present application, feed rate is understood as meaning a conveyed weight of bulk material per time unit into the device, which can also be referred to as throughput. This feed rate is usually indicated as weight per time unit, for example in t/h or else kg/min.

A higher achievable feed rate has the advantage that a smaller number of housings is necessary for fractionating a bulk material conveyed at a high feed rate, with the result that the method can be carried out in a cost-effective manner.

Alternatively preferably, two housings, preferably three housings, and very particularly preferably at least four housings, are set in an oscillating motion in the method by way of the mechanical coupling means and the drive means. The drive means is, for example, a controllable motor.

This has the advantage that the bulk material can be divided between the various housings and hence the fractionation can take place in parallel in the housings and thus the feed rate can be increased. Consequently, a simple scalability of the device as a function of the requirements of the respective application is possible.

Alternatively particularly preferably, the mechanical coupling means comprises a rotatable coupling shaft which is connected by means of belts to the gyrating masses arranged on the roof and floor of the housing. In particular, the belts are mounted in the end regions of the coupling shaft. The drive means sets the rotatable coupling shaft in rotation, with the result that the gyrating masses are driven by means of the belts.

In particular, the coupling shaft has at least one belt pulley in the end regions to receive the belts.

An end region of a coupling shaft is understood within the sense of the present application to mean that the shaft has parallel to the axis on the respective ends of the shaft a respective region at which the belt is connected to the coupling shaft. In particular, this region has, as seen from the respective ends of the shaft of twice the width of the belts.

This has the advantage that the coupling shaft and the drive means are mounted outside the inner space of the housing and thus the entire inner space of the housing can be used for fractionation, with the result that the throughput can be increased. Moreover, the mechanical coupling means configured as a rotatable coupling shaft with belts can be designed in a structurally simple manner, with the result that this can be produced in a cost-effective manner.

Alternatively very particularly preferably, the housing is suspended, such that, when used as intended, the housing is set in an oscillating motion and/or circular motion substantially perpendicular to the action of gravity.

The housing can consequently thus be suspended on a frame of the device or else for example on a ceiling of a building. Examples of suitable means of suspension are bamboo bars or other flexible bars such as, for example, ones made of metal, metal alloys, polyester, CRP and epoxy resin or any combinations thereof. A flexible bar is understood within the sense of the present application as meaning a bar which is substantially flexible upon lateral deflection, i.e. not upon the exertion of force along the longitudinal axis of the bar.

Particularly preferably, a screen reject during fractionation is carried out in the plane of a screen surface of the screen in at least two, in particular, mutually opposite edge sections of the screen which are separated from one another. In particular, the screen reject is the first fraction.

Screen reject is to be understood within the sense of the present application as meaning that bulk material which cannot fall through and/or be conveyed through the respective screen openings of the screen, since it has excessively large particle sizes in relation to the screen openings.

Moreover, within the sense of the present application, two edge sections of the screen separated from one another is to be understood as meaning that two regions are present on the periphery of the screen by means of which the screen reject can be conveyed away from the screen, wherein these two regions are not in contact with one another. For example, in the case of rectangular screens, these can be two sides of the rectangle which lie parallel to one another.

Opposite edge sections are understood as meaning those edge sections which both have a point of intersection with a straight line drawn through the center point of the screen plane. For example, this is fulfilled in the case of a rectangular screen for the respective parallel sides of the rectangle if at least in each case these two sides function as edge sections. This has the advantage that the throughput can be increased since the screen reject can be discharged in a larger region of the screen.

A further aspect of the present invention is directed at a device for fractionating bulk material. This device is used in particular for carrying out a method as explained above. The device comprises at least one housing with an inner space for receiving at least one screen. In particular, at least one screen stack can be received in the inner space. This device is used for fractionating the bulk material into at least one first fraction and one second fraction. The housing has at least one inlet for feeding the bulk material to the screen and at least one outlet for discharging at least one fraction of the bulk material. The housing, when used as intended, has a roof and a floor. At least one respective gyrating mass is arranged on or in the roof and on or in the floor. The device has at least one mechanical coupling means arranged outside the inner space, wherein the gyrating masses are coupled to one another by way of the at least one mechanical coupling means. In addition, the gyrating masses can be driven by way of the mechanical coupling means. The device also has a drive means for driving the at least one mechanical coupling means, wherein the at least one housing can as a result be set in an oscillating motion by means of the gyrating masses.

A gyrating mass is understood within the sense of the present application to mean a mass designed such as to have an unbalance, i.e. its mass is not distributed in a rotationally symmetrical manner, with the result that, during rotation of this gyrating mass, the at least one housing can be set in an oscillating motion.

The device according to the invention is used in particular for carrying out the above-described method and therefore has all the advantages of the above-described method.

Particularly preferably, the housing is suspended, for example on a frame of the device or on a ceiling of a building. In particular, the housing is suspended by means of bars which are fastened to the housing substantially at the level of the center of gravity of the housing.

This has the advantage that the installation of the device is possible in a simple and cost-effective manner since, for example, by contrast with a device set up on the floor, no damping means for damping the oscillating motion in addition to the elastically bendable bars used for suspension are necessary. The bars themselves have corresponding damping properties upon lateral deflection with respect to the longitudinal axis.

Particularly preferably, the at least one inlet is arranged in the roof and/or the at least one outlet is arranged in the floor.

This design of the device has the advantage that, in particular, the arrangement of the inlet in the roof and of the outlet in the floor of the housing leads to a space-saving construction, since no inlet or outlet means mounted laterally on the housing are required. Consequently, for example, a plurality of housings can be arranged in close formation, with the result that a high fractionating output can be achieved per unit area.

Particularly preferably, the drive means is a motor which, in particular, can be controlled.

This has the advantage that the oscillating motion can be controlled by controlling the motor.

Very particularly preferably, the at least one mechanical coupling means is a rotatable coupling shaft with belts arranged on the coupling shaft. In particular, the belts are arranged in the end regions of the coupling shaft. Each gyrating mass is connected to at least one belt. The rotatable coupling shaft can be set in rotation by way of the drive means in order to drive the gyrating mass. This structural design of the device has the advantages already explained above.

Alternatively preferably, the device has at least two housings, preferably three housings, and very particularly preferably at least four housings, for the parallel fractionation of bulk material.

This has the advantage that the throughput of bulk material through the device is scalable as a function of the requirements of the respective application.

Alternatively particularly preferably, the device has exactly one rotatable coupling shaft with at least two belts arranged on the coupling shaft. The belts are connected to the gyrating masses of the housing which are respectively arranged on or in the roof and on or in the floor. The housing and the at least second housing are in each case connected by means of further belts in order to drive the gyrating mass of the second housing which is respectively arranged on the roof and the floor.

In other words, the gyrating masses of the housing arranged on or in the roof and on or in the floor are connected to the coupling shaft by means of belts. The gyrating masses of the second housing arranged on or in the roof and on or in the floor are connected by means of further belts to the corresponding gyrating masses of the housing arranged on or in the roof and on or in the floor. If the rotatable coupling shaft is now set in rotation, this rotation is transmitted by means of the belts to the gyrating masses of the housing, with the result that they are driven and in particular set in rotation. As a result, the gyrating masses of the second housing are driven, i.e. in particular set in rotation, via the further belts.

As a result, in particular at least the housing and the second housing are set in oscillation.

This has the advantage that, with only one drive and a corresponding number of belts, the at least two housings can be set in a synchronous, oscillating motion. This structural design of the coupling means is thus cost-effective and the oscillating motion can be simply controlled by controlling the drive means.

Alternatively very particularly preferably, the at least two housings are releasably connected to one another. In particular, the latter are connected to one another by clipping and/or screwing.

For example, the at least two housings can be releasably connected to one another by means of a clipping mechanism.

This has the advantage that, according to the respective requirements of the application, the required number of housings can be used to achieve a required throughput through the device.

Particularly preferably, the screens of the screen stack are individually interchangeable and/or designed as inserts which can in each case be inserted into the housing in the manner, for example, of a drawer.

This has the advantage that, when damaged, screens can be simply interchanged or else can be cleaned and moreover the screen stack can be adapted flexibly to the required fractionation.

A further aspect of the present invention is directed at a rotatable coupling shaft for a device as described above, in particular for carrying out a method as described above. The rotatable coupling shaft can be connected to a drive means of the device in order to drive the rotatable coupling shaft. On the rotatable coupling shaft, in particular in its end regions, there can be respectively mounted a connecting means, in particular a belt, for connection to at least one respective gyrating mass arranged on or in a roof and on or in a floor of a housing of the device. The connection is produced in such a way that the housing can be set in an oscillating motion by means of the gyrating masses.

This rotatable coupling shaft corresponds to the above-described coupling shaft and thus has all the above-described advantages.

A further aspect of the present invention is directed at a system comprising a coupling shaft, at least two belts and in particular a drive means for driving the coupling shaft. The system is used for connecting to a device for fractionation in order to produce a device as described above. In particular, a method as described above is to be carried out. The system can be connected to a housing of the device. The housing has at least one respective gyrating mass arranged on or in a roof and on or in a floor of the housing. The two belts can be mounted respectively on the coupling shaft, in particular in its end regions, and can be connected to respectively one of the gyrating masses. This connection is configured in such a way that the housing can be set in an oscillating motion by means of the gyrating masses by driving the coupling shaft.

This system is used for producing an above-described device and in particular for carrying out the above-described method and therefore has the corresponding above-described advantages.

An additional aspect of the present invention is directed at the use of a device as described above for carrying out a method as described above for fractionating bulk material. In particular, bulk materials such as cement, lime, plastics, sand, unground cereal, bran and animal feeds or mixtures thereof are fractionated.

Here, a device as described above is used according to the above-described method. This use therefore has all the corresponding advantages.

A further aspect of the present invention is directed at a method for converting and/or upgrading a device for fractionating bulk material. In the method, the above-described rotatable coupling shaft or the above-described system is connected to a housing of the device in order to produce a device as described above.

This method has the advantage that already existing devices for fractionation which are not designed according to the invention can be converted and/or upgraded by means of this method, with the result that a device as described above can be produced which has the corresponding above-listed advantages.

The invention will be explained in greater detail below with reference to exemplary embodiments for better understanding without the invention being limited to the exemplary embodiments. In the drawing:

FIG. 3 shows a plan view of a roof of the device according to the invention as per FIG. 1;

FIG. 4 shows a front view of the device according to the invention as per FIG. 1;

FIG. 9 shows a plan view of the device according to the invention as per FIG. 7;

FIG. 10 shows a side view of the device according to the invention as per FIG. 7;

Figure 1:
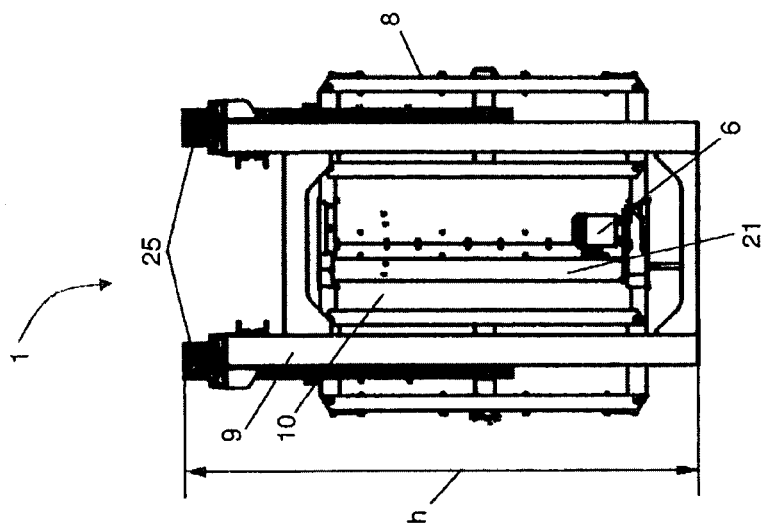
FIG. 1 shows a perspective illustration of a device according to the invention for fractionating bulk material.

FIG. 1 depicts a perspective illustration of a device 1 for fractionating bulk material. The device 1 has a housing 10 which is suspended on a frame 9 by means of bars 25.

The housing 10 has a door 8 which can be opened in order to obtain access to an inner space of the housing, in which inner space screens or screen stacks, not shown here, can be received for fractionating bulk material. The housing 10 has two inlets 13 through which bulk material can be conveyed into the housing 10, which bulk material is then fractionated in the housing 10 by means of the not shown screens or screen stacks. On the housing 10 there is mounted a drive means designed as a motor 6 and a coupling means designed as a coupling shaft 21.

During operation, the device 1 is now set in an oscillating motion by driving the coupling shaft 21 by means of the motor 6. This takes place by driving gyrating masses, not shown here, which are situated in the cover or in the floor of the housing 10 and are connected via belts, not shown, to the coupling shaft 21 and can thus be set in rotation. This rotation of the gyrating masses in conjunction with the suspension of the housing on bars 25 which are elastically bendable thus means that the housing 10 can be set in an oscillating motion.

Figure 2:
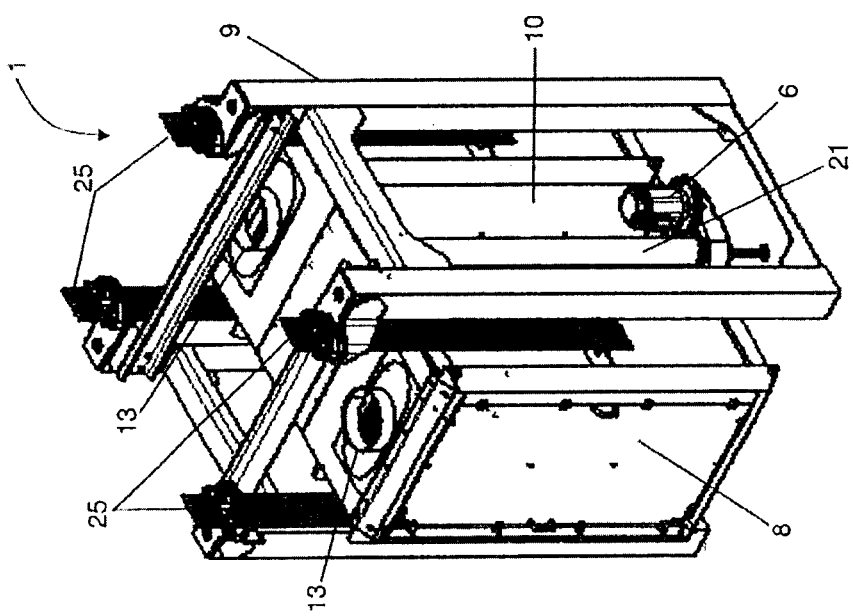
FIG. 2 shows a side view of the device according to the invention for fractionating bulk material as per FIG. 1.

FIG. 2 shows a side view of the device according to the invention as per FIG. 1 parallel to the plane defined by the door 8 as per FIG. 1. Identical reference signs designate identical features from hereon and hereinbelow in the figures and are therefore explained again only as required.

The device 1 has a housing 10 with a door 8, wherein the housing is suspended on a frame 9 by means of bars 2S. On the housing 10 there are mounted a motor 6 and a coupling shaft 21 for setting the housing 10 in an oscillating motion.

The device 1 for fractionating bulk material has a height h of 3.1 m.

FIG. 3 shows a plan view of the device 1 as per FIG. 1 perpendicular to the plane defined by the inlet openings 13 as per FIG. 1.

The device has a depth t of 1.8 m and a width b of 2.1 m. The device 1 has a housing 10 with two inlets 13 for feeding bulk material. The housing 10 is suspended on a frame 9 by means of bars, not shown here. The housing 10 has a covering 26 under which there is situated a gyrating mass which, however, is not arranged in the inner space of the housing. The inner space of the housing 10 serves for receiving the screens or a screen stack for fractionating and discharging the fed-in bulk material.

FIG. 4 depicts a front view of the device 1 as per FIG. 1 perpendicular to the plane defined by the door 8 as per FIG. 1.

The housing 10 with the door 8 is suspended on the frame 9 by means of bars 25 as explained above and has an inlet 13 through which bulk material 2 is conveyed into the housing 10 for fractionation.

Figure 5:
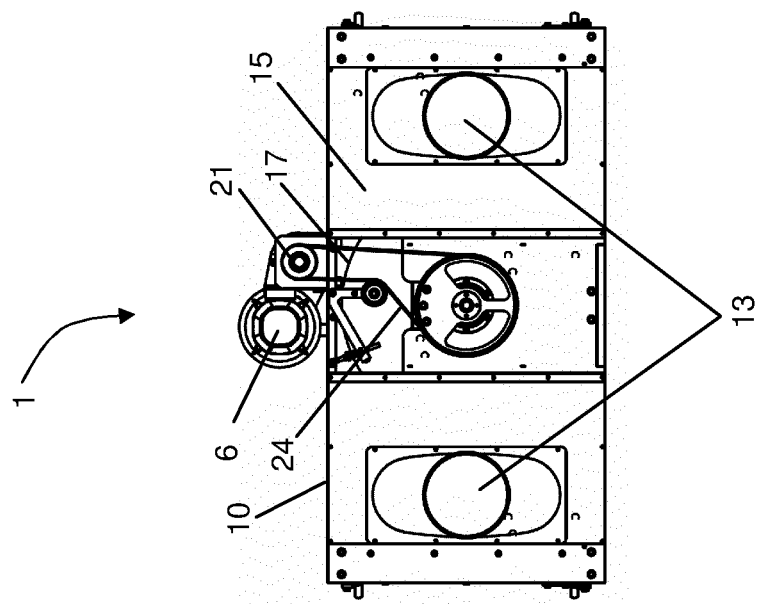
FIG. 5 shows a schematic illustration of the roof of the device according to the invention as per FIG. 1.

FIG. 5 depicts a schematic illustration of a roof 15 of the device 1 as per FIG. 1.

A housing 10 of the device 1 has two inlets 13 for feeding bulk material into the device for fractionation. The device 1 comprises a motor 6 which is mounted on the housing 10 and which is connected to a coupling shaft 21 in such a way that the latter can be set in rotation. In an end region of the coupling shaft 21 there is mounted a belt 24 which is connected to a gyrating mass 17 arranged on the roof 15 in such a way that said gyrating mass can be set in rotation. The gyrating mass 17 constitutes an unbalance, with the result that the housing 10 can be set in a vibrating motion when the gyrating mass 17 is driven or rotated.

The two inlets 13 have circular openings with a diameter of 300 mm.

Figure 6:
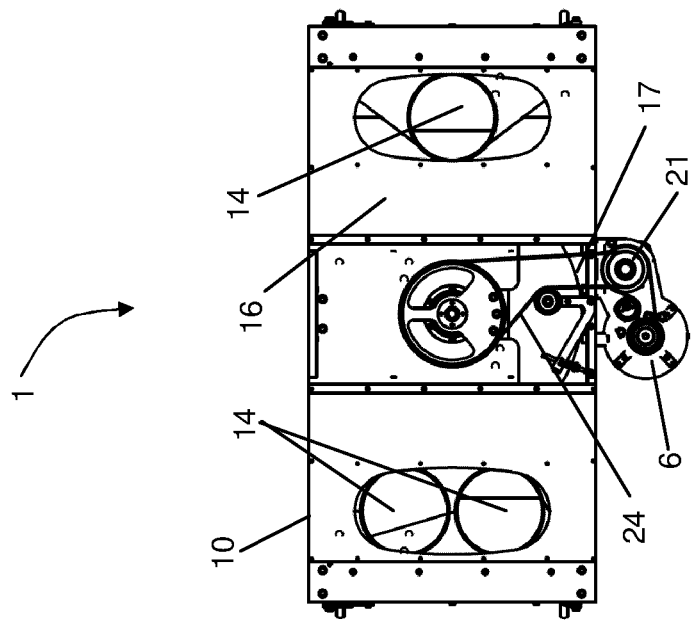
FIG. 6 shows a schematic illustration of the floor of the device according to the invention as per FIG. 1.

FIG. 6 depicts a floor 16 of a housing 10 of the device 1 as per FIG. 1.

The floor 16 has three openings 14, wherein the two adjacent openings 14 serve for discharging coarse impurities and sand and each have a diameter of 300 mm. The further outlet 14, which is spaced apart from the two outlets 14 by a gyrating mass 17, serves for discharging the fraction of the bulk material which is to be further processed, such as, for example, purified cereal.

On the housing 10 of the device 1 there is mounted a motor 6 which is connected to a coupling shaft 21 such that this coupling shaft 21 can be set in rotation. A belt 24 is mounted in an end region of the coupling shaft 21. The belt 24 is connected to a gyrating mass 17 which is mounted on the floor 16. Consequently, the gyrating mass 17, which constitutes an unbalance, can be driven, with the result that the gyrating mass 17 can be set in rotation. The motor 6 is the same motor as depicted in FIG. 5, i.e., the device 1 has only one motor 6 as drive means.

The arrangement explained here of motor 6, coupling means 21, belt 24 and gyrating mass 17 has the same purpose as explained in relation to FIG. 5.

Figure 7:
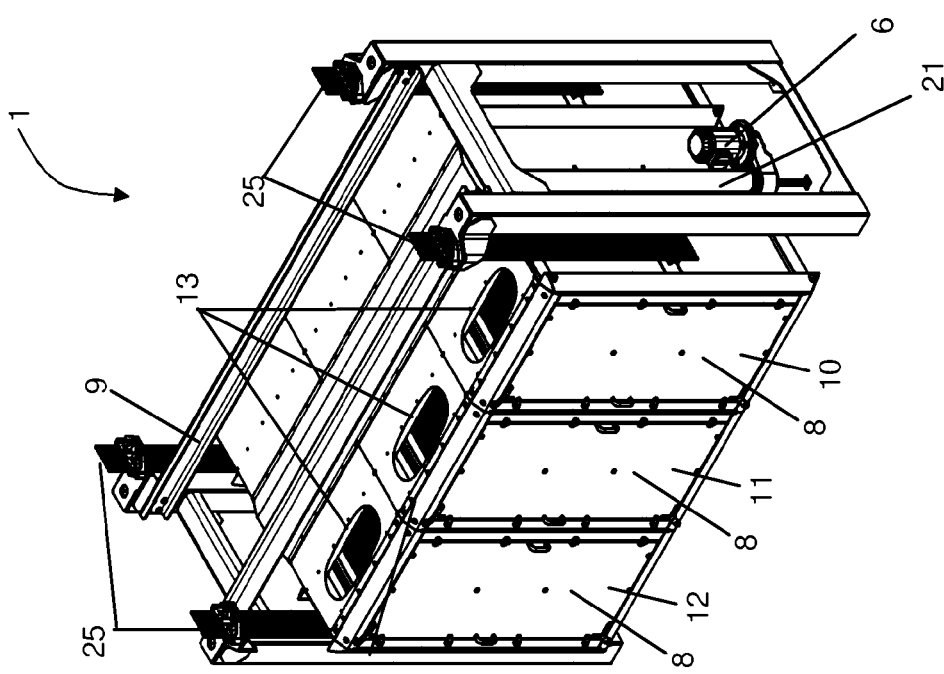
FIG. 7 shows a perspective illustration of an alternative device according to the invention with three housings.

FIG. 7 depicts an alternative embodiment according to the invention of a device 1 for fractionating bulk material. The device has a housing 10, a second housing 11 and a third housing 12 for parallel fractionation of bulk material. The housing 10, the second housing 11 and the third housing 12 each have an inlet 13 for conveying bulk material into the housing for fractionation.

The housings are releasably connected to one another by means of clip-on mechanisms, not shown. The first housing 10 and the third housing 12 are suspended on a frame 9 by means of bars 25. Each of the housings has a door 8 via which the respective inner space of the respective housing is accessible. Screens or screen stacks (not shown here) can be received in the respective inner spaces of the respective housings in order to fractionate the bulk material.

The device 1 has a motor 6 which is mounted on the housing 10 and which is connected to a coupling shaft 21 such that this coupling shaft 11 can be set in rotation. This arrangement of motor 6 and coupling shaft 21 and belts and gyrating masses, not shown, on the roof and floor of the housing 10, of the second housing 11 and of the third housing 12 makes it possible for the housings to be set in an oscillating motion, analogously to the description of the mode of operation with respect to FIG. 1. Accordingly, the device 1 with three housings thus has only one motor 6 and one coupling shaft 21 for producing the oscillating motion of the three housings.

Figure 8:
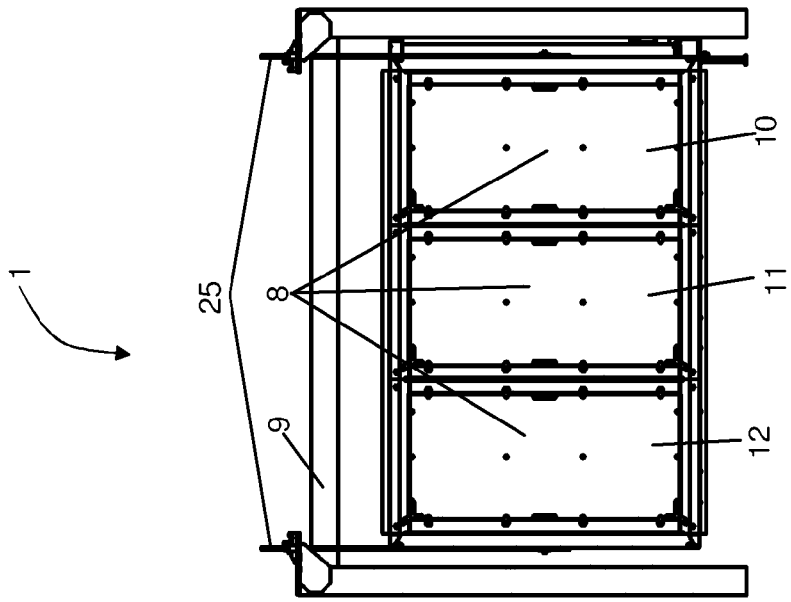
FIG. 8 shows a front view of the device according to the invention as per FIG. 7.

FIG. 8 depicts a front view perpendicular to the plane of the device 1 as per FIG. 7 defined by the doors 8.

The device 1 has a housing 10, a second housing 11 and a third housing 12, which in each case comprise a door 8. These three housings are suspended on a frame 9 by means of bars 25, wherein only the housing 10 and the third housing 12 are connected to the bars. The housing 10 is releasably connected to the second housing 11 by means of a clip mechanism and the third housing 12 is likewise releasably connected to the second housing 11 by means of a clip mechanism.

FIG. 9 depicts a plan view of the device 1 perpendicular to the plane defined by the inlets 13 as per FIG. 7.

The device 1 comprises a housing 10, a second housing 11 and a third housing 12 with in each case an inlet 13 on the roof 15 of the housing. As described previously, these three housings are suspended on a frame 9. The device 1 has a width b of 2 m and a depth t of 3.8 m.

FIG. 10 depicts a side view of the device 1 parallel to the plane defined by the doors 8 as per FIG. 7.

In the illustration under consideration here, the housing 10 of the device 1, which is suspended on the frame 9 by means of the bars 25, can be seen. On the housing 10, which has a door 8, a motor 6 and a coupling shaft 21 are mounted for setting the housing 10 in an oscillating motion in order to fractionate bulk material.

The device 1 has a height h of 3.1 m.

Figure 11:
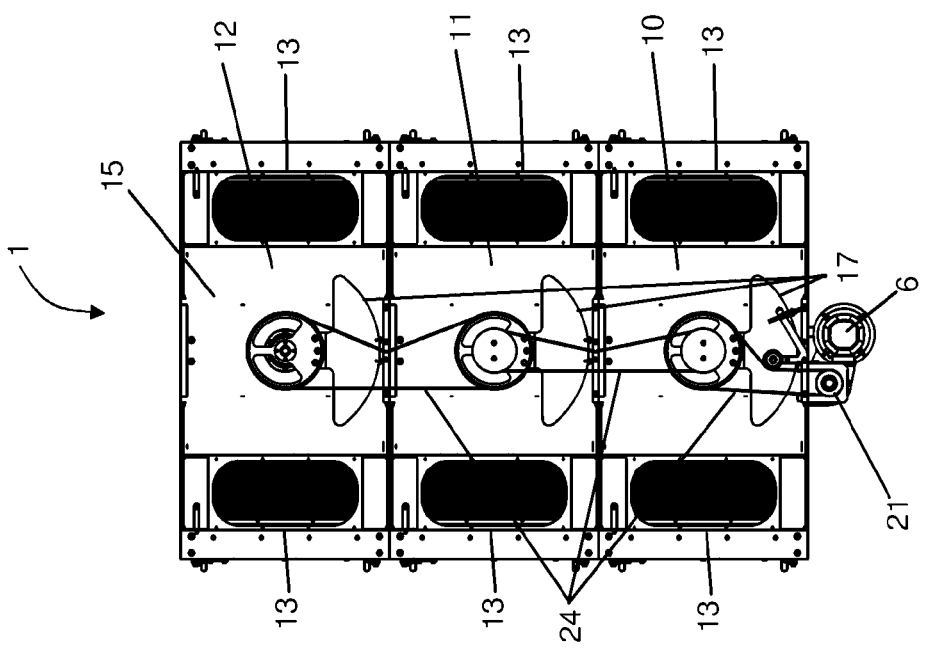
FIG. 11 shows a schematic illustration of the roof of the device according to the invention as per FIG. 7.

FIG. 11 depicts a roof 15 in a schematic illustration of the device 1 as per FIG. 7. By contrast with FIG. 7, however, the device 1 has six inlets 13, i.e. the housing 10, the second housing 11 and the third housing 12 each have two inlets 13.

A motor 6 and a coupling shaft 21 are mounted on the housing 10, wherein the motor 6 and the coupling shaft 21 are connected to one another such that the coupling shaft 21 can be set in rotation. Gyrating masses 17 are arranged on the roof 15 of the housings, wherein each of the housings has a respective gyrating mass 17 on the roof 15.

The gyrating mass 17 of the housing 10 is connected to the coupling shaft 21 by means of a belt 24. The gyrating mass 17 on the roof 15 of the second housing 11 is connected to the first gyrating mass 17 by means of a further belt 24 and the gyrating mass 17 of the third housing 12 is connected to the gyrating mass 17 on the roof 15 of the second housing 11 by means of a further belt 24. Consequently, all three gyrating masses 17 on the roof 15 of the housings can be driven by means of the one coupling shaft 21. If the coupling shaft 21 is set in rotation by the motor 6, the gyrating mass 17 on the housing 10 is driven by means of the belt 24 and set in rotation. The further belt 24 between the gyrating masses 17 on the housing 10 and the second housing 11 thus also causes the second gyrating mass 17 on the second housing 11 to be driven, which second gyrating mass is consequently likewise set in rotation. According to the same principle, the third gyrating mass 17 on the third housing 12 is then also set in rotation.

Figure 12:
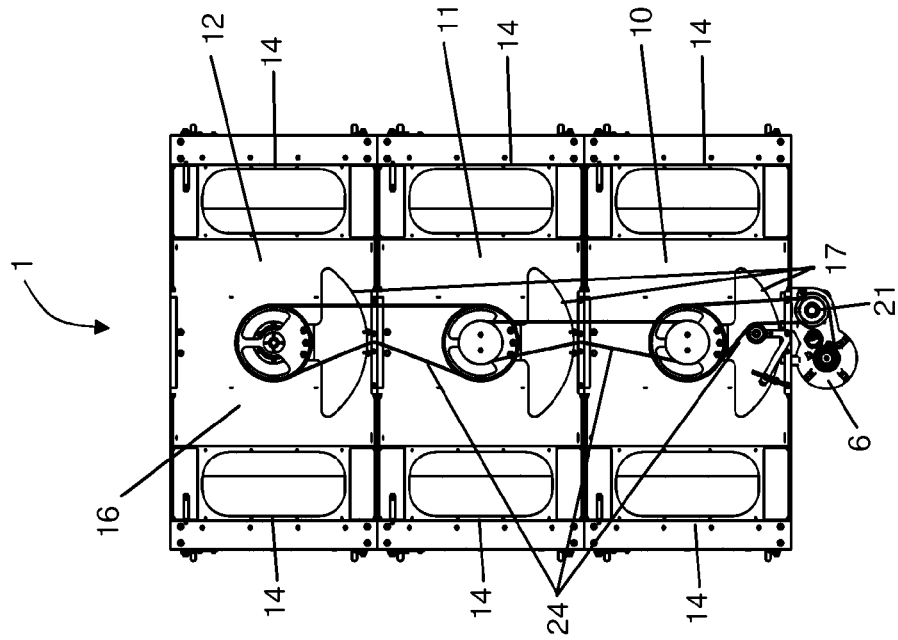
FIG. 12 shows a schematic illustration of the floor of the device according to the invention as per FIG. 7.

FIG. 12 depicts a floor 16 of the device 1 described in FIG. 11. This device 1 has a housing 10, a second housing 11 and a third housing 12, wherein each of the housings has two outlets 14.

Analogously to the description as per FIG. 11, the device has the motor 6 and the coupling shaft 21, which are mounted on the housing 10, wherein the coupling shaft 21 is connected to the gyrating mass 17 of the housing 10 by means of a belt 24. The gyrating mass 17 of the housing 10 is connected by a further belt 24 to the gyrating mass 17 of the second housing 11 and the gyrating mass 17 of the third housing 12 is connected by a further belt 24 to the gyrating mass 17 of the second housing 11.

The device 1 thus has three gyrating masses 17 of the floor 16 of the device 1 and three further gyrating masses, not shown, on the roof of the device 1. Driving three gyrating masses by means of the motor 6 via the coupling shaft 21 causes the housing to be set in an oscillating motion as already explained with respect to FIG. 11.

The invention claimed is:

1. A device for fractionating bulk material comprising:
   a housing which has:
   an inner space for receiving a screen for fractionating the bulk material into multiple fractions,
   an inlet for feeding the bulk material to the screen,
   an outlet for discharging a fraction of the bulk material,
   a roof and
   a floor,
   a first gyrating mass arranged outside of the inner space on or in the roof
   a second gyrating mass arranged outside of the inner space on or in the floor,
   a mechanical coupling means arranged outside of the inner space,
   a drive means,
   wherein the first gyrating mass is mechanically coupled to the second gyrating mass by the mechanical coupling means, and
   wherein the drive means is mechanically coupled to the mechanical coupling means in such a way that the housing can be set in oscillating and/or circular motion by means of the drive means driving motion of the gyrating masses by way of the mechanical coupling means.

2. The device as claimed in claim 1, wherein the device further comprises a frame on which the housing is suspended.

3. The device as claimed in claim 2, wherein oscillating motion and/or circular motion is substantially perpendicular to the action of gravity.

4. The device as claimed in claim 1, wherein the mechanical coupling means comprises a rotatable coupling shaft and a plurality of belts,
   wherein each gyrating mass is connected to and rotationally drivable by at least one of the plurality of belts, and
   wherein the rotatable coupling shaft is arranged to be drivable by the drive means in order to thereby drive the gyrating masses.

5. The device as claimed in claim 1, wherein the device comprises multiple housings, wherein each further housing has an inner space for receiving a further screen for parallel fractionation of bulk material.

6. The device as claimed in claim 5, wherein for each further housing, the device comprises further gyrating masses arranged outside of the inner space of each further housing and arranged both on or in the roof of each further housing and on or in the floor of each further housing.

7. The device as claimed in claim 6, wherein the mechanical coupling device comprises exactly one rotatable coupling shaft and a plurality of belts.

8. The device as claimed in claim 1, configured for use at a feed rate of at least 50 t/h.

* * * * *